Feb. 8, 1949.  M. R. GOFF  2,460,929
ROCKET HOLDING DEVICE
Filed Dec. 2, 1946  3 Sheets-Sheet 1
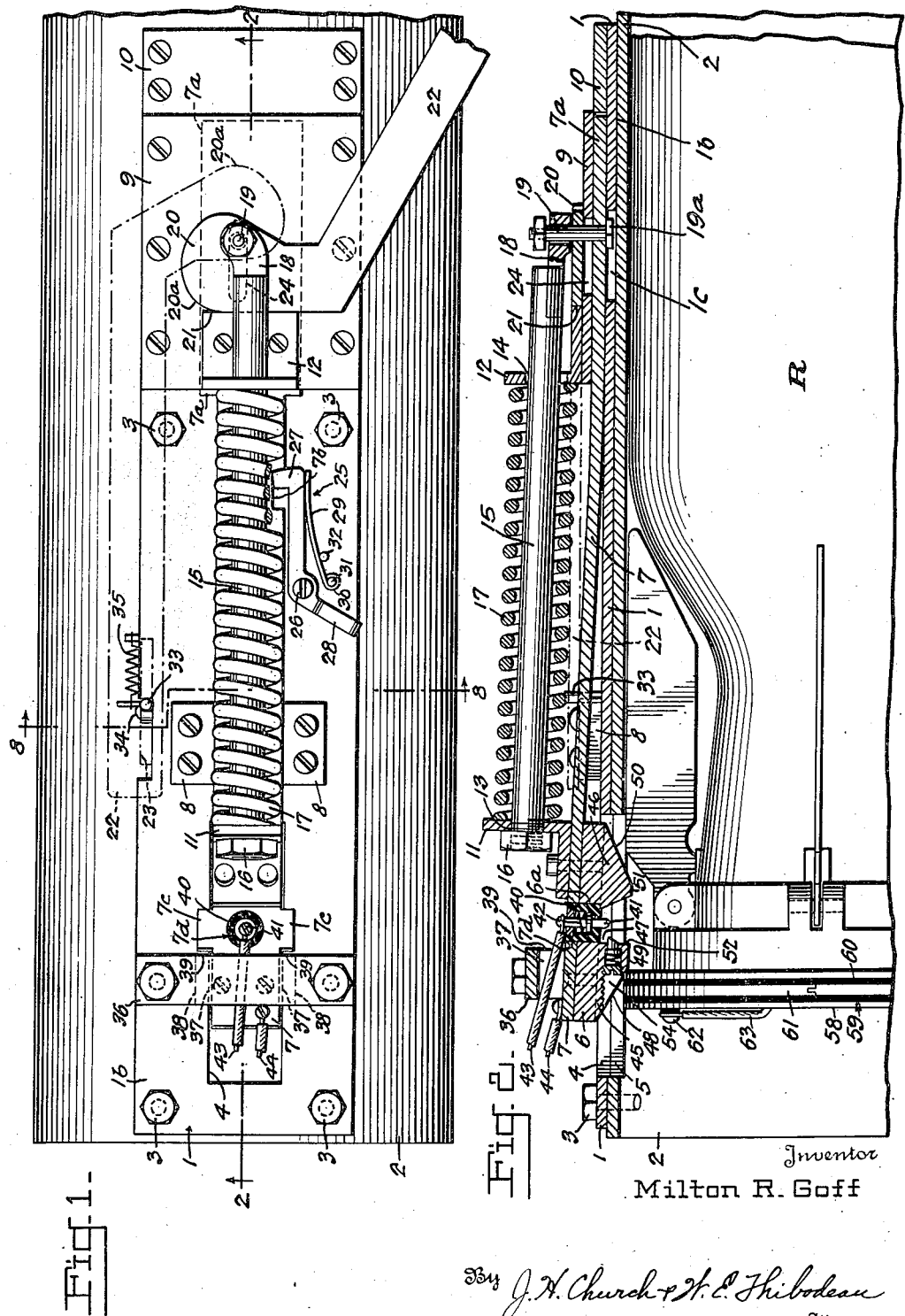
Inventor
Milton R. Goff

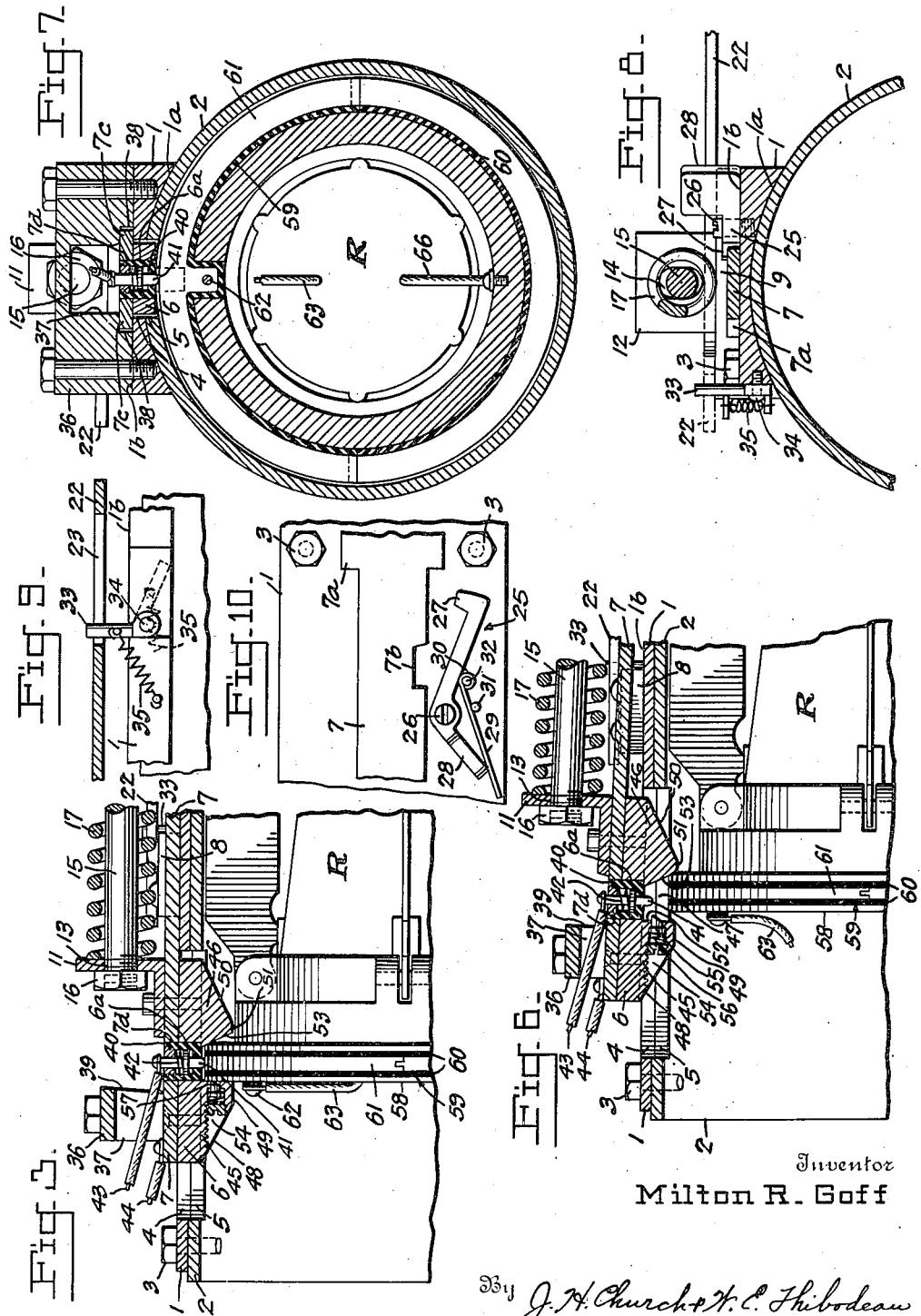

Feb. 8, 1949. M. R. GOFF 2,460,929
ROCKET HOLDING DEVICE
Filed Dec. 2, 1946 3 Sheets-Sheet 3
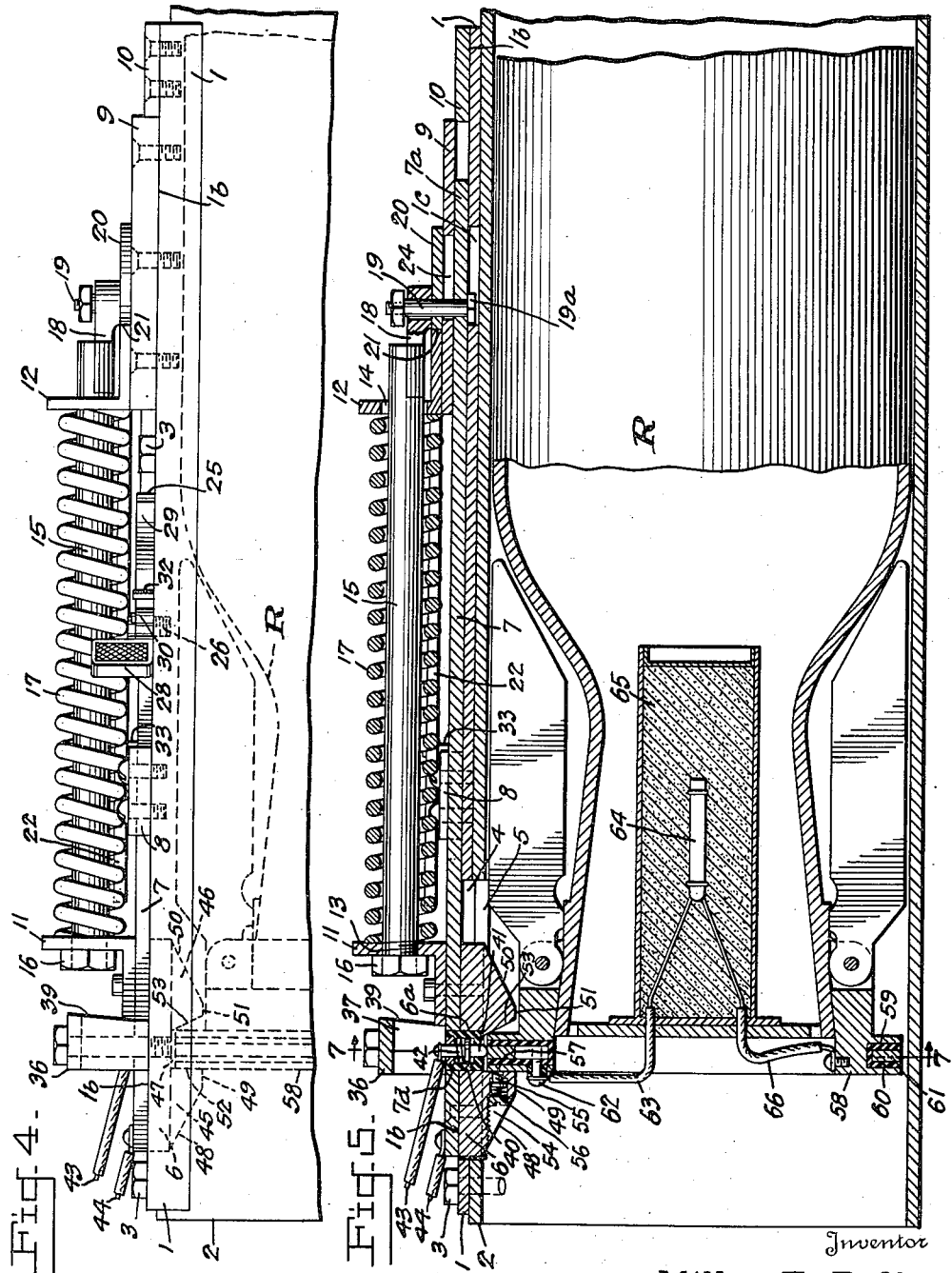
Inventor
Milton R. Goff Patented Feb. 8, 1949

2,460,929

UNITED STATES PATENT OFFICE 2,460,929

ROCKET HOLDING DEVICE

Milton R. Goff, Rochester, N. Y., assignor to the United States of America as represented by the Secretary of War Application December 2, 1946, Serial No. 713,574

7 Claims. (Cl. 89—1.7)

1

This invention relates to a new and useful improvement in rocket holding devices and is designed to provide a device for holding a rocket in its launching tube preparatory to firing the rocket from the tube. Holding a rocket in a single launching tube for firing from the ground is a simple mechanical problem. However, if a number of explosive-charge carrying rockets are to be launched from their positions in closely adjacent tubes, the forces to be controlled are so complicated as to present many problems difficult of solution. The difficulties to be surmounted become greatly increased if it be necessary that the launching tubes be loaded from either end, as is frequently the case. It is usually necessary to provide the holding device with electrical mechanism for firing the rocket. Additional problems may be presented when the holding device is to be used for rockets carrying explosive charges, to be launched from planes in flight. My improved device provides the satisfactory solution for all such problems.

Provision for holding a tube-launched rocket is commonly made by providing the rocket with either a projection or depression for co-action with a complementary depression or projection of the holding device. My improved device is designed to hold a rocket provided with either form of such means for holding it.

The essential feature of my improved device is the suitable combination of inclined planes, stops and springs to provide controlled movements of the rocket in the process of loading and launching. The device has a locking member which can be designed to engage either about a projection on the rocket or in a depression therein. This member is restrained in locking position from upward and rearward movement by the associated parts of the device, after the rocket has been loaded, preventing accidental displacement of the rocket. The rocket may be loaded from either end of the launching tube, the inclined faces of the locking member providing means for reciprocating the member by passage of the rocket in the tube in either direction to engage the member with the rocket. The rocket is positioned in the locking member while the member is in unlocked position, and the member and rocket are moved axially of the tube into locking position. Launching of the rocket automatically moves the member into unlocked position to free the rocket. The locking member can be moved from locking to unlocking position, by operation of its associated parts, to jettison an unfired rocket if desired. The device is provided with electrical mechanism to co-act with the electrical firing means of the rocket when the rocket is in locked position.

In the drawings:

Fig. 1 is a top plan view of the device mounted on the rocket launching tube, the parts being in loading position.

Fig. 2 is a longitudinal section on the line 2—2 of Fig. 1, in the direction of the arrows, showing the rocket being loaded forwardly through the rear end of the launching tube.

Fig. 3 is a fragmentary section showing the rocket seated in the holder jaws.

Fig. 4 is a side elevation of the device, the parts being in locking position to hold the loaded rocket.

Fig. 5 is a view similar to Fig. 2, the parts being in the position of Fig. 4.

Fig. 6 is a view similar to Fig. 3, the fired rocket leaving the holder jaws.

Fig. 7 is a transverse section on the line 7—7 of Fig. 5, in the direction of the arrows.

Fig. 8 is a fragmentary transverse section on the line 8—8 of Fig. 1, in the direction of the arrows.

Fig. 9 is a fragmentary side elevation of the locking pin for the operating lever shown in section.

Fig. 10 is a fragmentary top plan view of the catch for the slide, shown in inoperative position.

As illustrated in the drawings, my device has a base 1 suitably mounted at the rear end of the rocket launching tube 2, as by bolts 3. The lower face 1—a of the base 1 is concave to conform to the convexity of the cylindrical tube 2, and the upper face 1—b of the base 1 is plane. The base 1 and tube 2 are provided with longitudinal registering slots 4 and 5, respectively, suitably positioned adjacent the rear ends of base 1 and tube 2. A jaw-carrying member 6, slidable longitudinally and oscillatable transversely in the slots 4 and 5, is suitably mounted on the lower face of a flat spring 7 slidable longitudinally on the top face 1—b of base 1, guided between blocks 8 on base 1. The forward widened end 7—a of spring 7 is received in housing 9 suitably mounted on base 1. The forward movement of sliding spring 7 is limited by stop 10 suitably mounted on base 1. An L-bracket 11 is mounted on the upper face of spring 7 above the forward portion of member 6, and an L-bracket 12 is mounted on top of housing 9. Brackets 11 and 12 have orifices 13 and 14 respectively in which is received rod 15 provided at its rear end with nut 16 engaging bracket 11 on its rear face. A coil spring 17 about rod 15 bears between brackets 11 and 12 to urge spring 7 and its member 6 rearwardly. The forward end of rod 15 has an oriflced tongue 18 through which is loosely received a pintle pin 19 for a cam plate 20 co-acting with shoulder 21 of bracket 12. Plate 20 has an operating lever 22 provided with longitudinal slot 23. Pintle pin 19 passes through slot 24 in housing 9, and through spring 7, and has its head 19—a received in slot 1—c of base 1. From the foregoing description of the parts, it will be understood (Figs. 1 and 2) that when the lever 22 is in the position shown in solid lines in Figs. 1 and 2, the cam plate 20 is so positioned relative to shoulder 21 as to cause pin 19 to draw rod 15 forwardly, thereby sliding spring 7 and its member 6, forwardly, into the loading position, the spring 17 being tensioned by such movement. The device may be provided with a latch 25 which is pivoted about pin 26 in base 1 and has a head 27, co-acting with notch 7—b in spring 7, and an operating finger 28. A leaf spring 29 has one end rolled to form a collar 30 to fit about posts 31 and 32 in base 1, alternatively. When the collar 30 is about post 31, the spring 29 bears against post 32 and tends to urge head 27 toward spring 7 (Fig. 1). When the collar 30 is about post 32, the spring 29 bears against post 31 and tends to urge finger 28 to swing the latch 25 so that head 27 bears against collar 30 on post 32 and in inoperative position relative to spring 7 (Fig. 10).

When the spring 7 is held in its forward position by latch 25, the cam 20 may be rotated by lever 22 to the position shown in dotted lines in Fig. 1. The lever 22 is retained against accidental displacement by its locking pin 33 received in slot 23 and pivoted on pintle 34 on base 1 and provided with spring 35 which is so connected between base 1 and pin 33 that when pin 33 is moved upwardly past dead-center, the spring 35 tends to retain pin 33 in vertical position and when pin 33 is moved downwardly past dead-center the spring 35 tends to hold pin 33 in horizontal position.

Suitably mounted on the rear end of base 1, above slots 4 and 5 and the rear end of spring 7, there is a bridge member 36 providing a throat 37 opening upwardly above spring 7 slightly wider than the width of spring 7. At its bottom open end this throat 37 has lateral slots 38 formed in the pillars of bridge 36 and which are slightly wider vertically than the thickness of spring 7. Spring 7 has lateral wings 7—c designed to move into and out of slots 38 when spring 7 is reciprocated. The forward edges 39 of the pillars of the bridge members 36 are slightly slanted rearwardly downwardly to guide wings 7—c into slots 38.

The spring 7 and member 6 have registering transverse bores 7—d and 6—a in which is disposed a socket 40 of suitable electric insulation material in which is slidably mounted a contact pin 41 urged toward member 6 by a coil spring 42 and provided with suitably insulated wire 43. A similar wire 44 is suitably connected for electrical contact with spring 7.

The member 6 is provided on its underside with a pair of jaws 45 and 46 so related as to form a throat 47 therebetween. The rear jaw 45 has a cam surface 48 inclined downwardly forwardly to a bottom plane portion 49, and the forward jaw 46 has a cam surface 50 inclined downwardly rearwardly to a bottom plane portion 51. The rear wall 52 (forward face of jaw 45) of the throat 47 is a plane surface normal to the longitudinal axis of member 6, and the forward wall 53 (rear face of jaw 46) of the throat 47 is a plane cam surface inclined downwardly forwardly to bottom portion 51. The jaw 45 has a socket 54 in which is slidable a contact pin 55 urged forwardly by a coil spring 56 and having an oblique face 57.

The rocket R to be used with my device is provided with a peripheral collar 58 on the rear end of rocket R having suitable dimensions to be received into throat 47 and be engaged fore and aft by jaws 45 and 46. The collar 58 has a circumferential groove 59 formed therein in which is mounted a split ring insulating member 60. Mounted in member 60, there is a split-ring electric contact member 61 to co-act with contact pin 41 of the device. A binding post 62, suitably insulated electrically from the rocket body, connects ring 61 to wire 63 leading to the electrically actuated squib 64 of the igniter 65 in the rocket R. Wire 66 connects the squib 64 with collar 58 which co-acts with contact 55 to complete the electrical circuit when the rocket R has been loaded.

When the parts of the device are adjusted as shown in Fig. 1, a rocket may be loaded either forwardly or rearwardly into launcher 2. If, as shown in Fig. 2, the rocket R is loaded forwardly, the collar 58 engaging cam surface 48 of jaw 45 rocks member 6 and spring 7 upwardly against tension of spring 7. When collar 58 has cleared surface 49 and released member 6, spring 7 causes member 6 to move downwardly, collar 58 being received in throat 47, the rear wall 52 of the throat 47, because of its angular disposition, facilitating this movement. The parts have then moved from the position of Fig. 2 to the position of Fig. 3. If the rocket R is loaded rearwardly, collar 58 will bear on cam surface 50 of jaw 46, and the same result will be secured. Thus it is obvious that front and rear loading are provided.

With the parts in position shown in Fig. 3, spring 7 may be moved rearwardly by turning cam 20 by lever 22 to relieve pressure of cam 20 on shoulder 21. It will be noted that high point 20—a is so placed on cam 20, as to cause spring 7 to move slightly forward to relieve pressure on catch 25 so that it can be released from spring 7. As cam 20 is moved into dotted line position (Fig. 1), spring 17 will move rod 15, spring 7, the member 6 and the rocket R rearwardly into the position shown in Figs. 4 and 5. It will be noted that, when the collar 58 has been seated in throat 47 (Fig. 3), the spring 7 has registered its wings 7—c with slots 38, so that when the parts are moved rearwardly, wings 7—c move into slots 38, with the result that spring 7 is restrained against upward movement by bridge member 36 (Fig. 7), thereby securely locking collar 58 and the rocket R in the device. It is obvious that rocket R cannot be released until spring 7 has been moved forward sufficiently to free wings 7—c from bridge 36 to permit upward movement of spring 7 to free jaws 45 and 46 from collar 58.

It will be noted (Fig. 5) that, when the rocket R is locked in the device, the electrical contacts 41 and 55 of the device are pressed into intimate contact with contact member 61 and collar 58 of the rocket R, respectively, to complete the electrical circuit to squib 64.

When the rocket R is fired by the usual firing switch (not shown) causing the squib 64 to fire igniter 65, its initial movement forwardly exerted against jaw 46 will cause spring 7 to move forwardly against force of spring 17 (Fig. 6). When this movement has been sufficient to free wings 7—c from bridge member 36, the collar 58 bearing against cam surface 53 will force jaw 46 upwardly to free collar 58 and release rocket R for flight from launching tube 2.

When the parts have been thus moved forwardly by the action of rocket R, latch 25 retains them in the position shown in Fig. 1, for re-loading tube 2.

If it is not desired to retain the parts in loading position, after the firing, the catch 25 may be dispensed with, or if it is a part of the device, it may be rendered inoperative by the disposition of its parts as illustrated in Fig. 10.

If the catch 25 is not used, the parts will be returned, after the rocket R has been fired, to rear position by spring 17, the lever 22 being as shown in dotted lines in Fig. 1, and moving forwardly and rearwardly with spring 7, the slot 23 containing pin 33 permitting longitudinal reciprocation of lever 22, and pin 33 preventing rotation of lever 22 about pin 19. Obviously, when lever 22 is to be rocked to move cam 20, pin 33 is moved to inoperative position as shown in dotted lines in Fig. 9, and the parts can be moved forwardly into loading position (Fig. 1) by lever 22. It is obvious, that should a loaded rocket be not launched, it can be jettisoned, by moving the parts by lever 22, into the position of Fig. 3, and moving the rocket forwardly, by any suitable means to be removed through the forward end of tube 2.

Having described my invention, what I claim is:

1. In a device for holding a rocket in a launching tube, the combination of an engaging member slidable longitudinally of said tube and reciprocable radially of said tube; means to slide said member; means on said member to engage said rocket when it is placed in said tube; and means to restrain said member against reciprocation when it is slid rearwardly of the tube, the rocket co-acting with said engaging means to slide said member forwardly to release it from said restraining means, and to reciprocate said member to release the rocket, when the rocket is fired.

2. In a device for holding a rocket in a launching tube, the combination of a leaf spring slidable longitudinally of said tube; means for attaching the rocket to the leaf spring, said attaching means being urged by said leaf spring toward the rocket when the rocket is placed in said tube; a spring urging said leaf spring rearwardly of said tube; means for moving said leaf spring forwardly of said tube; and restraining means to prevent movement of said leaf spring away from said tube when said leaf spring has been moved rearwardly of said tube, the rocket co-acting with said attaching means to move said leaf spring forwardly to release said leaf spring from said restraining means and to move said leaf spring away from said tube and release said attaching means from the rocket, when the rocket is fired.

3. In a device for holding a rocket in a launching tube, the combination of a leaf spring slidable longitudinally of said tube; a pair of jaws carried by said leaf spring, for engaging the rocket, said jaws being urged by said leaf spring toward the rocket when the rocket is placed in said tube; a spring urging said leaf spring rearwardly of said tube; means for moving said leaf spring forwardly of said tube; and restraining means to prevent movement of said jaws relative to the rocket when said leaf spring has been moved rearwardly of said tube, the rocket co-acting with one of said jaws to move said leaf spring forwardly to release said leaf spring from said restraining means and to move said leaf spring away from said tube, and release said jaws from the rocket, when the rocket is fired.

4. In a device for holding a rocket in a launching tube, the combination of a leaf spring slidable longitudinally of said tube; a pair of jaws carried by said leaf spring, for engaging the rocket, said jaws being urged by said leaf spring toward the rocket when the rocket is placed in said tube; a spring urging said leaf spring rearwardly of said tube; means for moving said leaf spring forwardly of said tube; and a bridge member through which said leaf spring slides, having abutments engaging said leaf spring, when said leaf spring is moved rearwardly, to prevent movement of said leaf spring away from said tube, to lock said jaws in engagement with the rocket, the rocket co-acting with one of said jaws to move said leaf spring forwardly to release said leaf spring from said abutments and to move said leaf spring away from said tube and release said jaws from the rocket, when the rocket is fired.

5. In a device for holding, in a launching tube, a rocket provided with a peripheral collar, the combination of a base member mounted on said tube and provided with a longitudinal slot registering with a longitudinal slot in said tube; a block slidable longitudinally in said slots and oscillatable radially of said tube, said block having a pair of jaws forming a throat therebetween for reception of said collar therein, said jaws having inclined faces; a spring member, on which said block is mounted, slidable on said base member and having lateral wings, said spring member tending to urge said block toward said tube; a coil spring confined between said base member and said spring member and tending to urge said spring member rearwardly relative to said tube; manual means to slide said spring member forwardly relative to said tube; and a locking member mounted on said base member and co-acting with said wings whereby oscillation of said block is prevented when said spring member is moved rearwardly by said coil spring, said inclined faces of said jaws co-acting with said collar to oscillate said spring member to admit said collar to said throat, when said spring member is moved forwardly by said manual means, and the rocket is introduced through either end of said tube.

6. A device for holding a rocket in a launching tube comprising holding means on said tube for yieldingly engaging a complementary means on said rocket to hold same in firing position when said rocket is inserted from either end of the tube, manually operated latch means for locking said holding means on said complementary means against accidental release, and means operable upon rocket discharge to unlock said latch means whereby an engaged rocket may release itself from its yielding engagement with said holding means.

7. A device for holding a rocket in a launching tube comprising a member reciprocable radially of said tube and spring pressed inwardly to engage a rocket in said tube, said member being mounted for limited reciprocating movement longitudinally of said tube, a cammed catch on said member constructed and arranged to yieldingly engage a portion of said rocket when inserted from either end of the tube to hold same in firing position, a locking latch on said member responsive upon rearward motion thereof to lock said catch on said rocket, resilient means urging said latch rearwardly into locking position, and means operable by rocket motion upon discharge to move said member forwardly to release said locking latch.

MILTON R. GOFF.

REFERENCES CITED

The following references are of record in the file of this patent:

UNITED STATES PATENTS

| Number | Name | Date |
|---|---|---|
| 2,389,162 | McInnes | Nov. 20, 1945 |
| 2,391,864 | Chandler | Jan. 1, 1946 |
| 2,430,636 | Gould | Nov. 11, 1947 |